United States Patent
Zhu

(10) Patent No.: US 11,349,275 B2
(45) Date of Patent: May 31, 2022

(54) COMPLEMENTARY OPTICAL FIBER-BASED AMPLIFIERS WITH BUILT-IN GAIN FLATTENING

(71) Applicant: OFS Fitel, LLC, Norcross, GA (US)

(72) Inventor: Benyuan Zhu, Princeton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 410 days.

(21) Appl. No.: 16/435,641

(22) Filed: Jun. 10, 2019

(65) Prior Publication Data

US 2020/0044408 A1 Feb. 6, 2020

Related U.S. Application Data

(60) Provisional application No. 62/683,950, filed on Jun. 12, 2018.

(51) Int. Cl.
*H01S 3/067* (2006.01)
*H01S 3/16* (2006.01)
*H01S 3/30* (2006.01)

(52) U.S. Cl.
CPC ........ *H01S 3/06754* (2013.01); *H01S 3/1608* (2013.01); *H01S 3/302* (2013.01)

(58) Field of Classification Search
None
See application file for complete search history.

(56) References Cited

U.S. PATENT DOCUMENTS

| | | | |
|---|---|---|---|
| 5,991,068 A * | 11/1999 | Massicott | H01S 3/1302 359/337 |
| 6,172,803 B1 * | 1/2001 | Masuda | H01S 3/06758 359/334 |
| 6,441,952 B1 | 8/2002 | Duan et al. | |
| 6,665,114 B2 | 12/2003 | Benjamin et al. | |
| 7,085,039 B2 | 8/2006 | Foursa et al. | |
| 7,126,747 B2 | 10/2006 | Lee | |
| 7,924,497 B2 * | 4/2011 | Nissov | H01S 3/06758 359/334 |

(Continued)

OTHER PUBLICATIONS

Oh et al., "16-Channel C-band Hybrid Fiber Amplifier Comprising an EDFA and a Single Diode Laser Pumped Dispersion Compensating Raman Amplifier", ECOC 2000: European Conference on Optical Communication, Sep. 3-7, 2000, Proceedings vol. 1. (Year: 2000).*

(Continued)

*Primary Examiner* — Eric L Bolda
(74) *Attorney, Agent, or Firm* — Wendy W. Koba, Esq.

(57) ABSTRACT

A fiber-based optical amplifying system for use with a multi-wavelength input optical signal operating over a predetermined bandwidth is specifically configured to eliminate the need for a separate gain-flattening filter, improving the power conversion efficiency (PCE) of the system. Both a distributed Raman amplifier (DRA) and an erbium-doped fiber amplifier (EDFA) are used, where the DRA component is configured to use a pump beam with at a power level no greater than 200 mW. The EDFA is configured to exhibit a gain profile the complements that of the DRA, while also providing amplification that is no less than 10dB at any wavelength within the system bandwidth. With these parameters, the combination of the DRA and EDFA is able to maintain an output gain deviation of less than about 2 dB.

17 Claims, 2 Drawing Sheets

(56) References Cited

U.S. PATENT DOCUMENTS

| | | | |
|---|---|---|---|
| 8,228,598 B2 | 7/2012 | Chang et al. | |
| 8,817,365 B2 | 8/2014 | Eliyahu et al. | |
| 9,461,437 B2 | 10/2016 | Pelouch et al. | |
| 9,722,559 B2 | 8/2017 | Fu et al. | |
| 2003/0161031 A1* | 8/2003 | Benjamin | H01S 3/2375 359/337.4 |
| 2003/0169482 A1* | 9/2003 | Kung | H01S 3/302 359/341.1 |
| 2003/0179440 A1 | 9/2003 | Foursa et al. | |

OTHER PUBLICATIONS

Anwar, Nihal M. et al. "Backward Pumped Distributed Fiber Raman Amplifiers" Academy of Scientific Research and Technology 27th National Radio Science Conference, Mar. 16-18, 2010. (Year: 2010).*

Masuda H et al: "75-nm 3-dB gam-band optical amplification with erbium-doped fluoride fibre amplifiers and distributed Raman amplifiers in 9/ spl times/2 .5-GB/s WDM transmission experiment", IOOC-ECOC '97, 11th International Conference on Integrated Optics and Optical Fibre Communications / 23rd European Conference on Opticalcommunications. Edinburgh, Sep. 22-25, 1997; [IEE Conference Publication], Londoniee, UK, vol. 5, Sep. 22, 1997 (Sep. 22, 1997), pp. 73-76.

Foursa D G et al: 2.56 Tb/s (256xI0 1 -17Gb/ s) transmission over 11,000 km usinghybrid Raman/EDFAs with 80 mn of continuous bandwidth 11,Optical Fiber Communications Conference. (OFC). Postconference Technical Digest.Postdeadline Papers (IEEE Cat. N0.02CH37339) Opt Soc. America Washington, DC, USA; [Trends in Optics and Photonics Series. (TOPS)], IEEE,vol. TOPS . vol. 70, Mar. 17, 2002 (Mar. 17, 2002), pp. 878-880.

Zhu B et al: "Large-area low-loss fibers 1-17 and advanced amplifiers for high-capacity long-haul optical networks [Invited]", Journal of Optical Communications and Networking, Institute of Electrical and Electronics Engineers, US, vol. 8, No. 7, Jul. 1, 2016 (Jul. 1, 2016).

Anthony, Ricky, et al., "Study of Power Conversion Efficiency of a Novel Hybrid L-Band Erbium Doped Fiber Amplifier", International Journal of Computer Applications (0975-8887), vol. 44—No. 14, Apr. 2012, pp. 1-4.

Lundberg, Lars, et al., "Power Consumption Analysis of Hybrid EDFA/Raman Amplifiers in Long-Haul Transmission Systems", Journal of Lightwave Technology, vol. 35, No. 11, Jun. 1, 2017, pp. 2132-2142.

\* cited by examiner

COMPLEMENTARY OPTICAL FIBER-BASED AMPLIFIERS WITH BUILT-IN GAIN FLATTENING

CROSS-REFERENCE TO RELATED APPLICATIONS

This application claims the benefit of U.S. Provisional Application No. 62/683,950, filed Jun. 12, 2018 and herein incorporated by reference.

TECHNICAL FIELD

The present invention relates to fiber-based optical amplifiers and, more particularly, to a hybrid distributed Raman amplifier (DRA)/erbium-doped fiber amplifier (EDFA) arrangement that is specifically configured to eliminate the need for a separate gain-flattening filter, improving the power conversion efficiency (PCE) of the amplifier.

BACKGROUND OF THE INVENTION

In a wavelength division multiplexed (WDM) optical communication system, a large number of optical signals, each operating at a different wavelength, are transmitted along a common optical fiber. Ideally, the optical amplifiers in a WDM system would amplify each signal wavelength with the same gain. However, this is not the case. Fiber-based amplifiers in the form of both distributed Raman amplifiers (DRAs) and erbium-doped fiber amplifiers (EDFAs) are known to exhibit variations in their gain profiles across various wavelength bands of interest for most communication systems. As a result, some signals than are not sufficiently amplified may end up lost, while signals that experience too much gain may affect the performance of the transmission system due to optical fiber nonlinearity effects, if some type of correction is not applied to the gain profile.

Many WDM optical communication systems thus utilize a gain-flattening filter so as to even out the amount of gain "seen" by each signal wavelength passing through the amplifier. For example, a typical dense wavelength-division-multiplexed (DWDM) optical system may support the transmission of 86 separate wavelengths (channels) over a bandwidth of about 34 nm. To achieve a high level of transmission performance across the entire amplifier bandwidth, it is preferred for the gain to be as uniform as possible across the complete wavelength range of interest.

While gain-flattening filters are able to address the problem of gain profile non-uniformity, this is accomplished at the expense of reduced PCE, or equivalently quantum conversion efficiency (QCE), and may also degrade the noise performance of the amplifier. In applications where the "power budget" is a significant concern (such as in undersea cable systems, for example), the reduction in power associated with these gain-flattening filters is an on-going concern.

SUMMARY OF THE INVENTION

The issues associated with the prior art are addressed by the present invention, which relates to a complementary distributed Raman amplifier (DRA)/erbium-doped fiber amplifier (EDFA) configuration and, more particularly, to a complementary DRA/EDFA where the parameters of each amplifier component are controlled in a manner that provides a relatively flat gain profile over the bandwidth of interest, eliminating the need for a separate gain-flattening filter and maintaining a relatively high PCE (and QCE).

In accordance with the principles of invention as evidenced in one or more exemplary embodiments, a complementary DRA/EDFA is configured such that the pump power required by the DRA component is maintained at a somewhat low level (e.g., not exceeding about 100 mW), while the EDFA component is specifically implemented to exhibit a gain tilt that complements the DRA gain profile. By controlling the gain contribution of each amplifier component (as well as their profiles), it is possible to maintain a gain deviation no greater than about 2 dB and thus eliminate the need for a gain-flattening filter. As a result, both the PCE and QCE are improved over prior art arrangements that generated the same gain over the same bandwidth with similar gain flatness.

In one or more exemplary embodiments, the DRA component utilizes a counter-propagating pump signal, with the EDFA component disposed beyond the DRA component and utilizing a forward-propagating pump signal. An optical isolator may be inserted in the optical signal path at the output of each amplifier component to improve the overall noise performance of the system.

An exemplary embodiment of the present invention takes the form of a fiber-based optical amplifying system for use with a multi-wavelength input optical signal operating over a predetermined bandwidth. The fiber-based optical amplifying system is formed to include a distributed Raman amplifier (DRA) and erbium-doped fiber amplifier (EDFA). The DRA component is configured to utilize a Raman pump source with an output power no greater than 200 mW (preferably no greater than 100 mW) so as to provide a gain no greater than about 4 dB (preferably no greater than about 3 dB), resulting in contributing no more than about 30% (preferably no more than about 20%) of the total gain for the hybrid configuration. The EDFA component is configured to provide a majority of the gain (i.e., exhibit a gain no less than about 10 dB). The gain profile of the EDFA is intentionally configured to complement the gain profile of the DRA to minimize gain deviation across the bandwidth. Preferably, the gain deviation is maintained to a level less than 2 dB over the bandwidth of interest.

Another embodiment of the present invention is provided as an optical communication system supporting the transmission of a plurality of optical signals operating at different wavelengths within a defined signal band. Here, the optical communication system includes a transmission optical fiber for propagating the plurality of optical signals from a transmitter to a receiver, and at least one filterless (i.e., not requiring/using a gain-flattening filer) fiber-based hybrid optical amplifier disposed along the transmission optical fiber. The filterless fiber-based hybrid optical amplifier itself includes a distributed Raman amplifier (DRA) and an erbium-doped fiber amplifier (EDFA). The DRA includes a Raman pump source with an output power no greater than 200 mW and is configured to exhibit a first gain profile over the defined signal band. The EDFA is disposed at the output of the DRA and is configured to exhibit a second gain profile complementing the first gain profile over the defined signal band. The EDFA generates a gain no less than 10 dB at any wavelength within the predetermined bandwidth, so that the combination of the DRA and EDFA maintains an output gain deviation less than about 2 dB across the defined signal band of the optical communication system without using a gain-flattening filter at the output of hybrid optical amplifier.

Other and further embodiments of the present invention will become apparent during the course of the following description and by reference to the accompany drawings.

BRIEF DESCRIPTION OF THE DRAWINGS

Referring now to the drawings.

DETAILED DESCRIPTION

Figure 1:
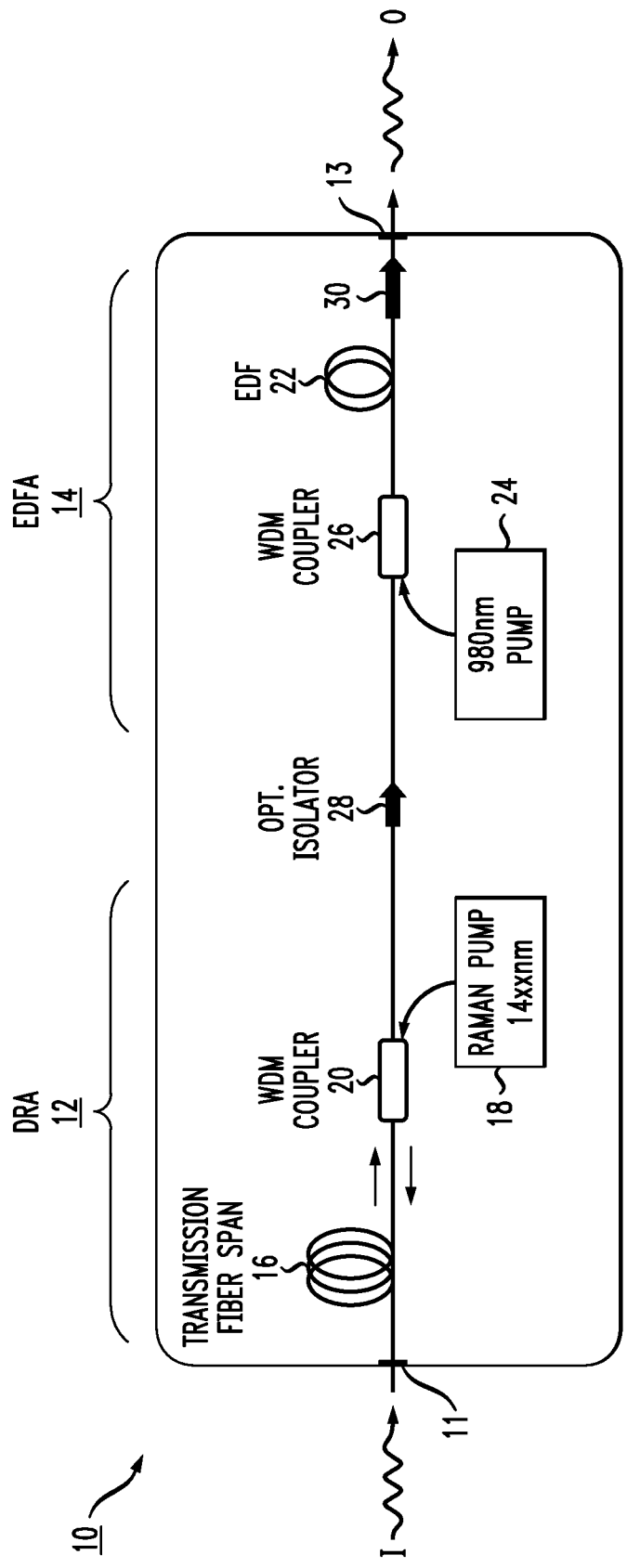
FIG. 1 illustrates an exemplary complementary DRA/EDFA system formed in accordance with the present invention.

FIG. 1 illustrates an exemplary amplifying system 10 formed in accordance with the principles of the present invention. As mentioned above, optical communications utilizing a multi-wavelength input signal (e.g., WDM or DWMW) require the use of an amplifying system that is able to "uniformly" amplify a relatively large number of separate wavelength channels. A DWDM system, for example, may employ over 50 channels (wavelengths) within a bandwidth of about 34 nm. As will be described in detail below, amplifying system 10 formed in accordance with the present invention is able to provide amplification with a gain deviation no greater than about 2 dB across the spectral region of interest, without the need for an additional gain-flattening filter. By eliminating the gain-flattening filter, the output power is no longer "filtered" and the power conversion efficiency (PCE) is improved over prior art arrangements that depend on the use of such filters.

PCE is typically defied as the measure of pump power converted to signal power for the purpose of amplification. In other words, PCE is a measure of the amplification system efficiency in terms of power and is given by the relation:

$$PCE = \frac{(P_{sig\ldots out} - P_{sig\ldots in})}{P_{pump}}.$$

Quantum conversion efficiency (QCE), on the other hand, is wavelength independent and, therefore, a more direct measure of the efficiency of the amplifying system. QCE is based on the ratio of signal photon energy to pump photon energy, expressed as:

$$QCE = PCE \times \frac{\lambda_{signal}}{\lambda_{pump}}.$$

With these definitions of PCE and QCE in mind, the amplifying system of the present invention will now be described in detail. Referring to FIG. 1, a multi-wavelength input signal I is shown as being coupled into an input port 11 of amplifying system 10, with an amplified multi-wavelength output signal O shown as exiting amplifying system 10 at an output port 13. For reasons described in detail below, the amplified output is depicted as exhibiting a relatively flat gain profile over the wavelength range of interest (here, a gain deviation of less than about 2 dB).

In operation of amplifying system 10, multi-wavelength input signal I is first passed through a distributed Raman amplifier (DRA) 12, which adds a certain amount of gain to the multi-wavelength signal, with the amplified output from DRA 12 then applied as an input to an erbium-doped fiber amplifier (EDFA) 14. EDFA 14 continues the amplification process to create multi-wavelength amplified output signal O. In accordance with the principles of the present invention, various operating parameters of DRA 12 and EDFA 14 are specifically configured to eliminate the need for a gain-flattening filter to be included at the output of amplifying system 10.

In particular, DRA 12 is configured to utilize a relatively low power pump source (e.g., less than about 200 mW, preferably less than 100 mW) for a DRA using a typical span length of optical fiber. Maintaining the power of the DRA pump source at this level than ensures that its gain contribution is no greater than about 30%; said another way, DRA 12 is formed in accordance with the teachings of the present invention is configured to exhibit a gain no greater than about 4 dB (preferably no greater than about 3 dB).

In conjunction with the gain contribution from DRA 12 and accordance with the present invention, EDFA 14 is configured to provide the desired amount of overall gain. Additionally, EDFA 14 is configured to exhibit a gain profile (at times defined by the "tilt" of the profile as a function of wavelength) that complements the DRA gain profile, allowing for the gain deviation to be minimized. As mentioned above, the ability to minimize the gain deviation allows the amplifying system of present invention to eliminate the need for a gain-flattening filter (which inevitably removes some output power from signal), and yields an improved PCE and QCE (with respect to typical prior art configurations).

DRA 12 is shown as utilizing a span of transmission fiber 16 as the gain medium, with a Raman pump source 18 coupled into transmission fiber 16 through a wavelength division multiplexing (WDM) coupler 20. Transmission fiber 16 may comprise, for example, single mode fibers such as industry standardized ITU G.652 or G.654, with a span length on the order of 50-100 km to create Raman gain within the wavelength range of interest. Raman pump source 18 itself is in the form of a laser diode operating at a wavelength of about 1435 nm (for example), with a power level no greater than 200 mW (preferably no greater than 100 mW). This arrangement operates in a manner well-known in the art, where the presence of the pump beam triggers Raman-based amplification of the propagating multi-wavelength signal.

In the embodiment of FIG. 1, WDM coupler 20 is disposed at the output of transmission fiber 16 so that the beam from pump source 18 is directed as a counter-propagating wave (with respect to multi-wavelength input signal I) within transmission fiber 16. While either a co-propagating or counter-propagating configuration may be used, a counter-propagating arrangement is known to provide a greater PCE (and QCE). In accordance with the principles of the present invention, the power P of pump source 18 is controlled to yield a gain no greater than about 4 dB (preferably no greater than 3 dB) across the wavelength spectrum. Such gain can be achieved in G.652 type fiber with less than about 100 mW of pump power, although for fibers with larger mode area (such as G. 564), higher pump power (less than about 200 mW, for example) is required to achieve a similar level of gain. It is to be noted that in some instances it is desirable to limit the power applied to the DRA, while in others it is desirable to limit the gain (or fraction of gain) derived from the DRA relative to the EDFA.

EDFA 14 is shown in the exemplary embodiment of FIG. 1 as being formed as a co-propagating optical amplifier. The co-propagating scheme provides good noise performance for the amplification (i.e., low noise figure, NF), which is important for submarine long haul transmission systems, even though it is slightly less power efficient than a counter-propagating configuration. The increase in pump power relative to standard EDFA components, in combination with a control of the length (and dopant concentration) of the fiber itself, more than outweigh the use of the co-propagating arrangement. Indeed, a filterless hybrid fiber amplifier formed in accordance with the present invention is considered to be particularly well-suited for long-haul transmission applications (including, for example, undersea transmission systems), where limited access to an electrical power source requires the maintenance of a high PCE value.

In particular, EDFA 14 is shown as comprising a section of erbium-doped fiber 22, with a pump beam operating at a wavelength of 976 nm provided by a pump source 24. A WDM coupler 26 is disposed at the input to erbium-doped fiber 22 and is used to couple the beam from pump source 24 into erbium-doped fiber 22.

In accordance with the principles of the present invention, the length $L_{EDFA}$ of erbium-doped fiber 22, the concentration of dopant within fiber 22, and the power of the pump beam may all be controlled to generate amplification within the propagating multi-wavelength optical signal that is no less than about 10 dB. As will also be discussed below, the "tilt" of the gain profile associated with EDFA 14 is configured to complement the gain profile of DRA 12 so that the combination of DRA 12 and EDFA 14 yields an amplifying system with a gain deviation no greater than about 2 dB.

In the specific embodiment of FIG. 1, a first optical isolator 28 is shown as disposed in the signal path between the output of DRA 12 and the input of EDFA 14, and a second optical isolator 30 is shown at the output of EDFA 14. It is to be understood that while the inclusion of these isolators is preferred, they are not required in the most general form of a hybrid amplifier formed in accordance with the teachings of the present invention.

Figure 2:
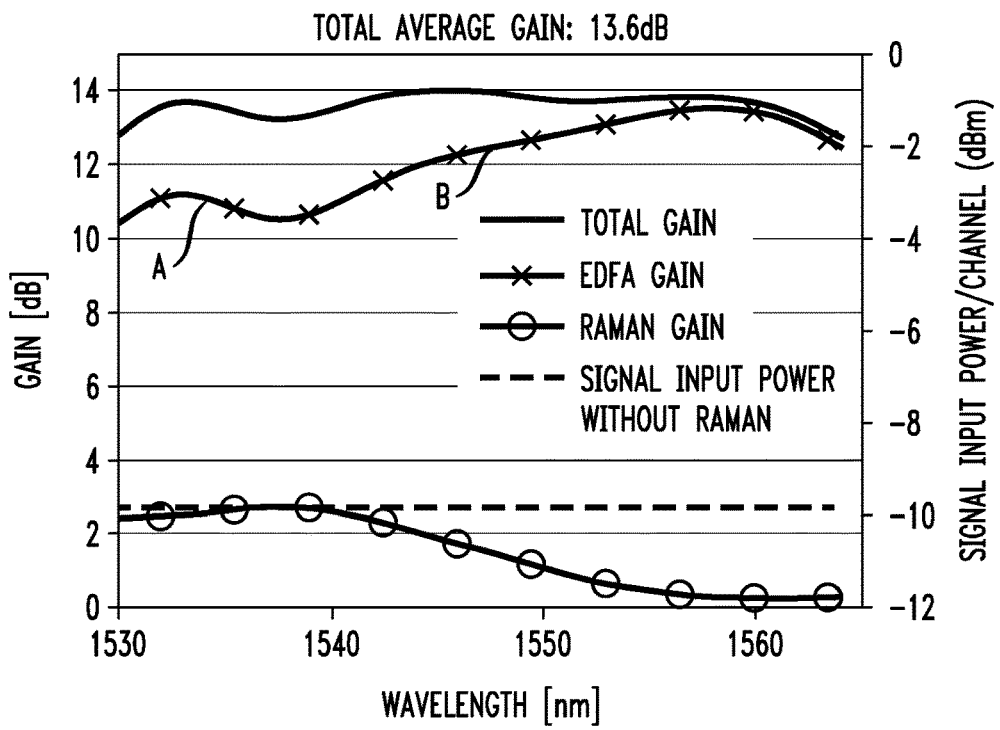
FIG. 2 is a plot of gain profiles associated with one embodiment of the present invention.

FIG. 2 contains gain profile plots associated with one exemplary configuration of the present invention. In particular, the gain profile for DRA 12 over the wavelength range of 1530 nm to 1564 nm is shown, where in typical arrangements this bandwidth may support over 80 separate wavelength channels. The gain profile for EDFA 14 is also shown, as well as the "total" gain for the combination of DRA 12 and EDFA 14. For this exemplary configuration, DRA 12 utilized a Raman pump beam operating at a wavelength of 1435 nm, with an output power of 80 mW. The gain from DRA 12 is shown in this particular configuration as having a maximum of 2.7 dB (which is about 20% of the total gain) at a wavelength around 1538 nm, with the gain falling off significantly and approaching zero by 1560 nm.

The gain profile of EDFA 14 as shown in FIG. 2 is shown in this particular example as having a minimum value of about 10.4 dB (about 76% of the total gain generated within the hybrid amplifier), and exhibiting a "dip" (tilt) along area A (within the wavelength range of about 1535 nm to 1540 nm) to complement the "maximum" gain region of DRA 12. For this particular configuration, EDFA 14 was formed of a section of erbium-doped optical fiber with a peak absorption of 6.3 dB/m near the wavelength of 1530 nm, with a length $L_{EDFA}$ of about 10.1 m, and used a pump beam having a power of about 390 mW. The gain profile of EDFA 14 is shown as increasing as a function of wavelength along area B (reaching a maximum of about 13.3 dB) to complement the fall-off of gain associated with DRA 12 across this same bandwidth. Various techniques, well-known in the art, may be utilized to create a gain profile for EDFA 14 that complements the profile associated with DRA 12 (e.g., controlling the dopant concentration within the doped fiber, the length of the fiber, and the like).

The combination of these two profiles, as shown in FIG. 2, yields a gain profile with a total average gain of about 1.3.6 dB with a gain deviation of less than 1.27 dB. Thus, by virtue of controlling the operating parameters of DRA 12 and EDFA 14 in accordance with the principles of the present invention, it is possible to form a fiber-based optical amplifier for use in a WDM/DWDM optical communication system that does not require the inclusion of a gain-flattening filter. Without needing to remove a portion of the generated output power (which inevitably occurs with the use of again-flattening filter), the PCE and QCE values of the inventive amplifying system are improved over the prior art.

The signal input power (when the Raman pump is turned "off") is also plotted in the graph of FIG. 2. It should be noted that the input signal power without Raman gain is essentially flat, with about −9.8 dBm per channel (for the case of 86 total DWDM wavelength channels over a 34 nm bandwidth), with this particular configuration of the inventive amplifying system creating an output power of about 23.1 dBm.

Figure 3:
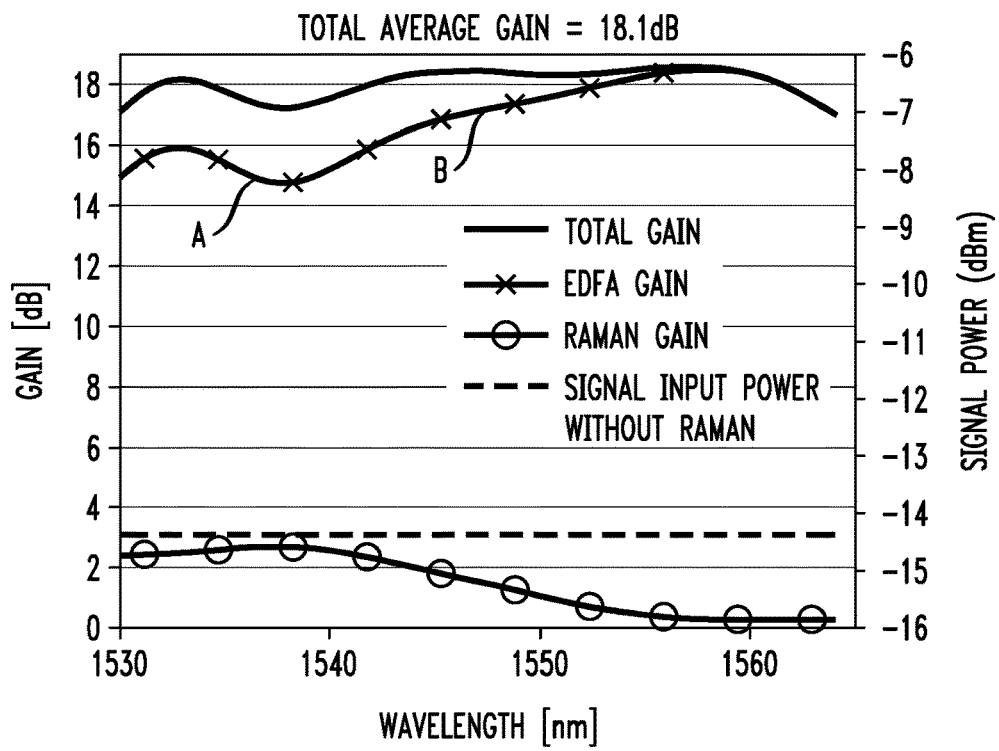
FIG. 3 is a plot of gain profiles associated with an alternative embodiment of the present invention.

FIG. 3 contains gain profile plots associated with another exemplary configuration of the present invention, in this case providing an increased level of gain with respect to the configuration associated with FIG. 2. The specific parameters for DRA 12 in this configuration are chosen to be the same as that for the configuration associated with the plots of FIG. 2, particularly maintaining the pump power at a level of 80 mW. However, the parameters for EDFA 14 are modified. In particular, a pump having an output power of 408 mW is used for this example. As a result, the gain profile for EDFA 14 is shown as having a minimum value of 14.4 dB (about 81% of the total gain generated within the amplifier), significantly greater than that of the configuration of FIG. 2. Again, the gain profile for EDFA 14 exhibits a "dip" (tilt) along area A (within the wavelength range of about 1535 nm to 1540 nm) to complement the "maximum" gain region of DRA 12. In the configuration associated with the plots of FIG. 3, the gain profile of EDFA 14 is shown as increasing as a function of wavelength along area B (reaching a maximum of about 18.5 dB) to complement the fall-off of gain associated with DRA 12.

The total gain profile plot is shown as having an average value of 18.1 dB, and exhibits a gain deviation no greater than 1.56 dB, still below the desired 2 dB limit even for this higher gain arrangement.

In comparison, in order to obtain 18.1 dB gain across the 34 nm bandwidth of 1530-1.564 nm (with the same output power of 23.1 dBm as shown in FIG. 3), a prior art amplifying system using a combination of an EDFA and a gain-flattening filter would require the use of a 600 mW pump source. The QCE for this prior art arrangement is 51%, while the QCE for the arrangement of the present invention based on the configuration of FIG. 3 is 60%. This 9% improvement in QCE is significant for long-haul transmission systems, such as undersea communication systems.

It is contemplated that various other complementary configurations of a DRA and EDFA may be utilized to maintain gain deviation less than the acceptable about 2 dB value. Indeed, as long as the pump power utilized by the DRA is no greater than about 100 mW and the gain provided by the EDFA is no less than about 10 dB, it is contemplated that the complementary arrangement will maintain this desired level of gain deviation (i.e., less than 2 dB) and thus eliminate the need to include a gain-flattening filter in the amplifying system. A preferred embodiment may utilize a counter-propagating DRA and a co-propagating EDFA (or other type of rare earth-doped amplifier), but it is to be understood that other co- and counter-propagating configurations may also be utilized as long as the power contributions and gain profiles of the two amplifier components are controlled in the manner described above.

While the principles of the invention have been described herein, it is to be understood by those skilled in the art that this description is made only by way of example and not as a limitation as to scope of the invention. Modifications and substitutions by one of ordinary skill in the art are considered to be within the scope of the present invention, which is not to be limited except by the following claims.

What is claimed is:

1. A fiber-based optical amplifying system for use with a multi-wavelength input optical signal operating over a predetermined bandwidth, the fiber-based optical amplifying system comprising:
    a distributed Raman amplifier (DRA) including a Raman pump source with an output power no greater than 200 mW, the DRA comprising a standard single mode optical fiber of a length $L_{DRA}$ selected to exhibit a first gain profile over a wavelength range from 1530-1564 nm, wherein the predetermined bandwidth exhibits a value of about 34 nm; and
    an erbium-doped fiber amplifier (EDFA) disposed at the output of the DRA and configured to exhibit a second gain profile complementing the first gain profile over the predetermined bandwidth, the EDFA generating a gain no less than 10 dB at any wavelength within the predetermined bandwidth, the combination of the DRA and EDFA maintaining an output gain deviation less than about 2 dB across the predetermined bandwidth of the fiber-based optical amplifying system, across the wavelength range from 1530-1560 nm.

2. The fiber-based optical amplifying system as defined in claim 1 wherein the Raman pump source operates with an output power no greater than 100 mW.

3. The fiber-based optical amplifying system as defined in claim 1 wherein the DRA provides optical gain no greater than 4 dB.

4. The fiber-based optical amplifying system as defined in claim 3 wherein the DRA provides optical gain no greater than 3 dB.

5. The fiber-based optical amplifying system as defined in claim 1 wherein the DRA contributes a gain percentage no greater than 30% in combination with gain from the EDFA.

6. The fiber-based optical amplifying system as defined in claim 5 wherein the DRA contributes a gain percentage no greater than 20% in combination with gain from the EDFA.

7. The fiber-based optical amplifying system as defined in claim 1 wherein the system further comprises a first optical isolator disposed between the DRA and the EDFA.

8. The fiber-based optical amplifying system as defined in claim 1 wherein the system further comprises a second optical isolator disposed at the output of the EDFA.

9. The fiber-based optical amplifying system as defined in claim 8 wherein the system further comprises the first optical isolator disposed between the DRA and the EDFA.

10. The fiber-based optical amplifying system as defined in claim 1 wherein the DRA is configured as a counter-propagating amplifier, including
    a wavelength division multiplexer (WDM) coupled to an output of the section of standard single mode optical fiber, wherein the Raman pump source is coupled to the WDM so as to direct the pump beam into an output endface of the section of standard single mode optical fiber.

11. The fiber-based optical amplifying system as defined in claim 10 wherein $L_{DRA}$ is in the range of about 50 km to about 100 km.

12. The fiber-based optical amplifying system as defined in claim 1 wherein the EDFA is configured as a co-propagating amplifier, including:
    a section of erbium-doped optical fiber of length $L_{EDFA}$; and
    a WDM coupled to an input of the section of erbium-doped optical fiber, wherein the pump source is coupled to the WDM so as to direct the pump beam into an input endface of the section of erbium-doped optical fiber.

13. The fiber-based optical amplifying system as defined in claim 12 wherein the section of erbium-doped optical fiber is configured to exhibit a peak absorption of 6.3 dB/m.

14. An optical communication system supporting the transmission of a plurality of optical signals operating at different wavelengths within a defined signal band, the optical communication system comprising
    a transmission optical fiber for propagating the plurality of optical signals from a transmitter to a receiver; and
    at least one filterless fiber-based hybrid optical amplifier disposed along the transmission optical fiber, a filterless fiber-based hybrid optical amplifier comprising:
        a distributed Raman amplifier (DRA) including a Raman pump source with an output power no greater than 200 mW, the DRA comprising a standard single mode optical fiber of a length $L_{DRA}$ selected to exhibit a first gain profile over the defined signal band; and
        an erbium-doped fiber amplifier (EDFA) disposed at the output of the DRA and configured to exhibit a second gain profile complementing the first gain profile over the defined signal band, the EDFA generating a gain no less than 10 dB at any wavelength within the predetermined bandwidth, the combination of the DRA and EDFA maintaining an output gain deviation less than about 2 dB across the defined signal band of the optical communication system without using a gain-flattening filter at the output of hybrid optical amplifier.

15. The optical communication system as defined in claim 14 wherein the system includes a plurality of filterless fiber-based hybrid optical amplifiers, disposed at predetermined locations along the transmission optical fiber.

16. The optical communication system as defined in claim 15 wherein the communication system comprises a long-haul transmission system.

17. The optical communication system as defined in claim 16 wherein the long-haul transmission system comprises an undersea transmission system.

* * * * *